Dec. 8, 1942.  E. D. TILLYER  2,304,217
METHOD AND APPARATUS FOR MAKING LENSES
Filed Jan. 20, 1938
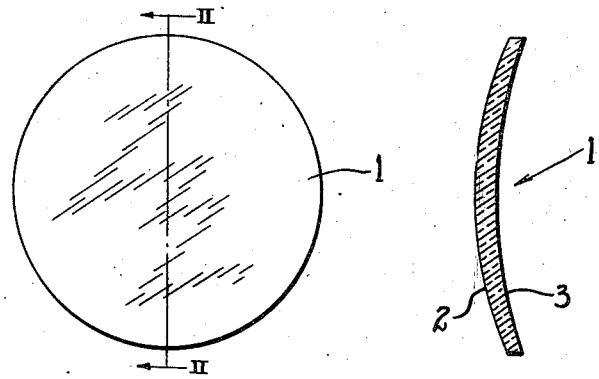
Fig. I  Fig. II
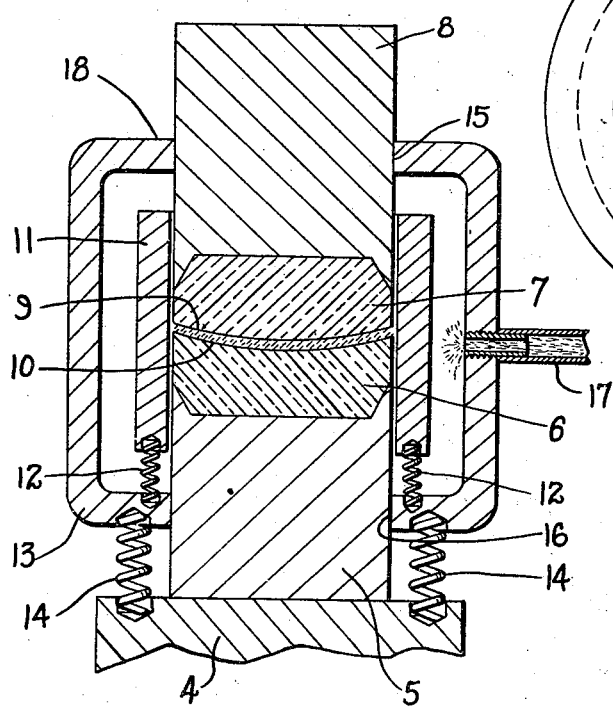
Fig. III
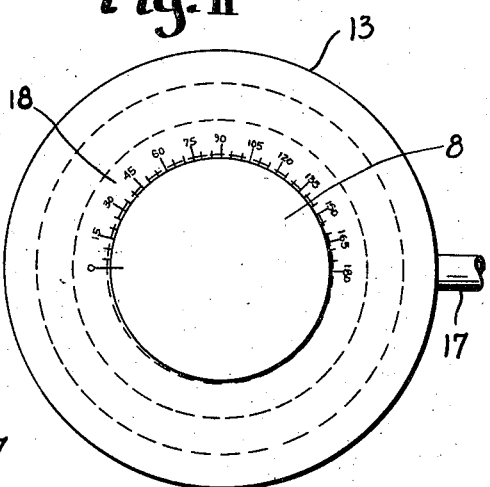
Fig. IV
INVENTOR.
EDGAR D. TILLYER
BY Harry H. Stygll
ATTORNEY.

Patented Dec. 8, 1942

2,304,217

UNITED STATES PATENT OFFICE 2,304,217

METHOD AND APPARATUS FOR MAKING LENSES

Edgar D. Tillyer, Southbridge, Mass., assignor to American Optical Company, Southbridge, Mass., a voluntary association of Massachusetts Application January 20, 1938, Serial No. 185,888

6 Claims. (Cl. 18—5)

This invention relates to lenses and particularly to a new and improved method and apparatus for making lenses and other articles requiring an optical surface from a material capable of being molded by heat and pressure.

A principal object of the invention is to provide a new and improved method of making lenses of an optically isotropic, thermo-plastic or thermo-setting material.

Another object of the invention is to provide a new and improved apparatus for making lenses having a good optical surface of such material.

Another object of the invention is to provide a new improved method and apparatus for making lenses of an optically isotropic, non-frangible material which will prevent the formation of bubbles in the lens during its formation.

A principal object of the invention is to provide high pressure on the material to be molded without producing excess strain or stress in the highly polished molding surfaces.

Other objects and advantages of the invention will become apparent from the following description taken in connection with the accompanying drawing. It will be understood that many changes may be made in the details of construction, arrangement of parts and steps of the process without departing from the spirit of the invention as expressed in the accompanying claims. I, therefore, do not wish to be limited to the exact details shown and described as the preferred form only has been shown by way of illustration.

Referring to the drawing:

Fig. I is a front view of a lens made according to my invention;

Fig. II is a sectional view taken on line II—II of Fig. I;

Fig. III is a sectional view of the apparatus; and

Fig. IV is a top plan view of the apparatus.

In the manufacture of thermo-plastic or polymerizable optically homogeneous lens material, the lenses are made by molding each lens with curvatures on its surfaces necessary to give desired refractive properties to the finished lens. In the molding of such lenses there has been considerable difficulty due to the formation of bubbles in the lens during its manufacture which bubbles destroyed the utility of certain portions of the lens and made the same unsalable. It, therefore, is a principal object of this invention to provide a new method and apparatus for molding lenses of such material whereby the formation of bubbles in the lenses during their manufacture will be avoided.

Referring more particularly to the drawing wherein similar reference characters designate corresponding parts throughout, the lens 1 is made of a non-frangible, thermo-plastic or polymerizable, optically homogeneous lens material, and has the surfaces 2 and 3.

Such materials are of a homogeneous plastic composition. Several of these compositions are now on the market and designated by various trade-names, such as Plexiglas, Lucite, Metastyrol, etc. Their characteristics are that they are not brittle, but that they are optically homogeneous, tough and non-frangible.

There are also certain phenolic condensation products now on the market, such as Bakelite, Catalin, Marblette, Fiberlon, etc., which may also be used.

Polymerized methyl methacrylate may be plasticized with non-volatile plasticizing agents, such as di-butyl phthalate, etc.

In general, the lens is to be preferably made of a polymerized product of an unsaturated alkyl compound and may be plasticized with a non-volatile compatable plasticizing agent, such as di-butyl phthalate, etc.

The lenses may be made of any desired form such as spherical, cylindrical, toric, or prismatic.

In making the lenses I utilize the apparatus shown in Figures III and IV.

This apparatus comprises a base or support 4 on which is placed a block 5 which supports a separate mold member 6. Over the member 6 is a similar member 7, over which is a backing member 8.

The separate mold members 6 and 7 may be made of glass or of any metal capable of taking an optical polish. These members 6 and 7 are replaceable and have on their surfaces 9 and 10 the curves desired on the opposite sides of the finished lens.

Around these members is the sleeve 11 supported on the springs 12, to prevent the lens material from escaping out of the edges of the mold.

Around the mold is the casing 13 which is supported on the support 4 by the springs 14. This casing has its edges 15 and 16 surrounding the members 5 and 8 preferably high pressure tight by packing or the like. Leading into this casing 13 is the pipe line 17.

The members 5 and 8 are preferably provided with means for heating and cooling such as having channels for the circulation of heated or cooled liquid therethrough.

In the manufacture of lenses by this process a mold member 6 having a curvature on its surface desired on one surface of the finished lens is placed in position on the member 5.

On this member 6 is placed a desired quantity of lens material, over which is placed the other separate mold member 7 which has its lower surface of the curvature desired on the opposite side of the finished lens and over this member 7 is placed the member 8.

The members 5 and 8 are then heated as described above preferably to 300 to 400 degrees Fahrenheit and gas or oil forced into the casing 13 through the pipe line 17 under a high pressure, for example 2800 pounds. At the same time a high pressure of for example 3000 pounds is applied on the member 8 and the oil or gas pressure forms a resistance so that only approximately 200 pounds differential pressure is on the mold faces 9 and 10.

It is to be understood that there is, on the mold faces 9 and 10, a pressure of substantially 3000 pounds per square inch when this amount of pressure is applied to the mold support 8. However, since there is a lateral or surrounding pressure of 2800 pounds per square inch applied by means of the liquid or gas through the inlet 17, it may be considered that the lens material is subjected to an environment or balanced pressure of 2800 pounds uniformly in all directions, and to a single directional excess or molding pressure of 200 pounds. The references to pressure throughout this specification, for instance 3000 pound pressure and 2800 pound pressure, are intended to mean pressure in pounds per square inch.

This 2800 pounds pressure around the lens prevents the formation of bubbles in the lens while at the same time the 200 pounds pressure causes the surfaces of the lens to take the curvature of the separate mold members. A cool liquid is then circulated through the members 5 and 8 to cause the lens to cool and set to its molded shape. The pressure is then released and the lens is then removed from the mold and the edge finished as desired in the usual manner.

It will be understood that the thickness of the lens will be controlled in order that the finished lens will have the desired optical refractive properties.

It will be understood that in order to make lenses of different refractive powers it is only necessary to replace the separate mold members 6 and 7 with others having the curvatures desired on the finished lenses and that in making cylindrical or prismatic lenses the upper part 18 of the casing 13 may have axis indications cooperating with an indication mark on the member 8 so that by rotating the members as desired relative to each other any desired location of axis or prism base may be obtained.

It has been found that brittle materials such as glass, speculum, metal, etc., make the best mold faces because they take the best optical polish and are easiest and cheapest to make but are very liable to be destroyed when used in the ordinary way with all the pressure being between the finished face of each mold and its opposite face and no consistent and uniform support around all other portions of the mold. These brittle materials, if supported in all directions by fluid pressure and with only a moderate differential pressure, will not break. Most of the materials it is desired to mold form bubbles when the necessary heat is applied without high pressures, although the materials flow readily at these temperatures, so the high pressure is necessary to prevent the formation of bubbles, just like high pressure keeps water from boiling at its ordinary boiling point.

From the foregoing it will be seen that I have provided simple, efficient and economical means for obtaining all of the objects and advantages of the invention in a facile, efficient and economical manner.

Having described my invention, I claim:

1. A device of the character described comprising a pair of aligned mold portions having the curvatures desired on the opposite sides of a lens to be molded from lens material placed between said mold portions, means for applying pressure to at least one of said aligned mold portions to mold the material, a casing substantially surrounding said aligned mold portions, means for applying fluid pressure within said casing while the material is being compressed by the aligned mold portions to partially counteract the pressure of said mold portions, and a sleeve within the casing surrounding said mold portions in substantially close relation thereto but spaced therefrom, said sleeve being so formed and positioned relative to said aligned mold portions as to allow pressure to be transmitted to said aligned mold portions and also by allowing said fluid pressure to be exerted upon the moldable material to retard extrusion of lens material during molding.

2. The method of molding a plastic lens comprising the steps of subjecting a quantity of lens material to a compression force to transform said lens material to a predetermined shape, physically restraining the lens material during said compression to tend to retard the flow of said lens material when under the influence of said compression force and further retarding said flow of said lens material by enclosing the physical restraining means within a sealed pressure chamber, and applying a fluid pressure within said chamber, said fluid pressure being less than the compression force exerted upon the moldable material.

3. The process of molding a plastic lens by means of a die, comprising the step of compressing a portion of plastic moldable material to be molded into shape under the influence of a molding pressure on said die, which moldable material is located in a substantially sealed chamber and has restricting means located within the sealed chamber substantially adjacent the peripheral edge of the moldable material while the molding pressure is effective, and applying a fluid under pressure within said sealed chamber, said fluid pressure being less than the molding pressure so that the fluid pressure will act upon the moldable material to retard volatilization of said moldable material during the molding operation.

4. A process of molding a plastic lens comprising placing a portion of plastic material between molding die portions, locating restricting means adjacent the peripheral edge of the moldable material between said molding die portions, locating said die portions and said restricting means within a sealed chamber, applying compression force on said material between said die portions and applying a fluid pressure within said sealed chamber of an amount less than the compression force so that the fluid pressure will act upon the moldable material to retard volatilization during the molding operation.

5. The method of molding a plastic lens comprising the steps of subjecting a quantity of lens material to a compression force to transform said lens material to a predetermined shape, locating a physical restraining means adjacent the lens material to retard the flow of said lens material when under the influence of said pressure, enclosing the lens restricting means adjacent the moldable material with a sealed pressure chamber, and applying a fluid pressure within said chamber, said fluid being less than the pressure exerted upon the moldable material.

6. A device of the character described comprising a pair of aligned mold portions having molding surfaces of the shape desired to be formed on the opposite sides of an article to be molded from moldable material placed between said mold portions, means for applying pressure to at least one of said aligned mold portions to mold said material, physical restraining means surrounding said aligned mold portions and the moldable material therein and casing means surrounding said physical restraining means and the material between said aligned mold portions having a fluid pressure therein of an amount which, when the material is being compressed by the aligned mold portions, said fluid pressure will function cooperatively with the physical restraining means to counteract the pressure on said mold portions to retard extrusion of the material from said mold portions during the molding of said material.

EDGAR D. TILLYER.